(12) United States Patent
Fisher (10) Patent No.: US 7,992,308 B1
(45) Date of Patent: Aug. 9, 2011

(54) EXTENDED REACH HEDGE TRIMMER

(75) Inventor: David B. Fisher, Bowling Green, KY (US)

(73) Assignee: MTD Products Inc, Valley City, OH (US)

( * ) Notice: Subject to any disclaimer, the term of this patent is extended or adjusted under 35 U.S.C. 154(b) by 1385 days.

(21) Appl. No.: 11/078,768

(22) Filed: Mar. 11, 2005

(51) Int. Cl.
*A01G 3/053* (2006.01)
*B25G 3/12* (2006.01)

(52) U.S. Cl. ............... 30/216; 30/208; 30/228; 30/231; 30/296.1; 188/381

(58) Field of Classification Search .................. 30/296.1, 30/379.5, 173, 176, 177, 180, 182, 194, 196–199, 30/208–210, 215–220, 223–228, 231, 340; 15/144.1, 144.2, 144.3, 144.4, 239, 242, 15/DIG. 18; 16/427, 429; 56/233–237; 83/486.1; 188/381; 700/900; 901/42; 403/116; 439/11, 439/13, 31

See application file for complete search history.

(56) References Cited

U.S. PATENT DOCUMENTS

| | | | |
|---|---|---|---|
| 2,730,803 A | 1/1956 | Kimball | |
| 3,104,687 A * | 9/1963 | Field | 83/486.1 |
| 3,597,842 A | 8/1971 | Greene | |
| 3,731,476 A | 5/1973 | Burgess | |
| 4,044,979 A | 8/1977 | Lemmo | |
| 4,145,810 A | 3/1979 | Belliston | |
| 4,207,675 A * | 6/1980 | Causey et al. | 30/296.1 |
| 4,359,822 A | 11/1982 | Kolodziejczyk | |
| 4,507,534 A * | 3/1985 | Kaufmann et al. | 219/86.7 |
| 4,515,423 A | 5/1985 | Moore et al. | |
| 4,638,562 A | 1/1987 | Drake | |
| 4,733,470 A | 3/1988 | Firman | |
| 4,760,646 A | 8/1988 | Siegler | |
| 4,976,031 A * | 12/1990 | Miller | 30/296.1 |
| 5,070,576 A | 12/1991 | Banta | |
| 5,132,601 A * | 7/1992 | Ohtani | 318/568.1 |
| RE34,358 E | 8/1993 | Miller | |
| D353,751 S | 12/1994 | Germano | |
| 5,411,238 A | 5/1995 | Caron | |
| 5,421,060 A | 6/1995 | Miller et al. | |
| 5,660,252 A * | 8/1997 | Lafon | 188/130 |
| 5,681,171 A * | 10/1997 | Park | 439/31 |
| 5,787,590 A | 8/1998 | D'Alessandro, Sr. | |
| 6,488,511 B1 * | 12/2002 | Stewart | 439/32 |
| 7,204,026 B2 * | 4/2007 | Phillips et al. | 30/394 |
| 7,399,209 B2 * | 7/2008 | Kodaira | 439/640 |
| 2002/0194739 A1 | 12/2002 | Krane et al. | |
| 2004/0255471 A1 | 12/2004 | Black | |

FOREIGN PATENT DOCUMENTS

EP 0 834 248 A2 4/1998
EP 1 059 025 A2 12/2000

* cited by examiner

*Primary Examiner* — Clark F. Dexter
(74) *Attorney, Agent, or Firm* — Wegman, Hessler & Vanderburg (57) ABSTRACT

The present invention is an extended reach power tool apparatus. The apparatus includes a powerhead and a yoke. The powerhead includes a motor which is enclosed by a casing. The yoke includes a base portion configured for being secured to a pole. The yoke also includes a boss configured for being pivotally secured to the powerhead. Further, the powerhead may be rotatable about the boss. The boss may form an aperture configured for receiving wiring, such that the wiring may be routed from a source, through the pole, and to the powerhead.

19 Claims, 9 Drawing Sheets

EXTENDED REACH HEDGE TRIMMER

BACKGROUND OF THE INVENTION

1. Field of the Invention

The present invention relates generally to power tools, particularly hedge trimmers, and specifically to an extended reach hedge trimmer with a pivotally connected and adjustable cutting head providing improved controlled cutting plane adjustability and safety of operation. The present invention utilizes a yoke pivotally connected to a powerhead which allows the powerhead to pivot about an axis of rotation on the yoke and which also provides electrical cord strain relief in embodiments using an electric motor. The invention further includes a friction brake for preventing free rotation of the powerhead about the axis to enhance operational safety of the trimmer.

2. Description of the Related Art

Motorized trimmers for cutting hedges and shrubs are widely recognized as being very useful in maintaining their aesthetically pleasing appearance. Typically, these hedge trimming devices include an engine or motor, which may be powered either electrically or through an internal combustion process, a handle apparatus and a cutting unit. Early versions of such hedge trimming devices typically include a one-sided reciprocating blade assembly and a drive mechanism or gear box which is in turn driven by the motor.

More recently, hedge trimmers utilizing a two-sided reciprocating blade means have been developed. The two-sided blade means is an improvement to trimmers since it permits a user to trim hedges while guiding the cutting means in either direction across the surface of the hedges. Additionally, the interval between sharpening of the reciprocating blades can be increased if both sides of the two-sided reciprocating blade means are evenly used.

There are known in the art numerous commercially available hedge trimmers having two-sided reciprocating cutting blades driven by an electric motor or an internal combustion engine. These trimmers typically have the cutting blade assembly and the motor positioned in close proximity to each other cantilevered off the forward end of the trimmer handle. This unbalanced arrangement requires the user of the trimmer to support the cantilevered weight of both the motor and reciprocating blade assembly while using the trimmer, thus tiring the user more quickly. Trimmers so arranged typically include a secondary handle to permit the user to more comfortably use the trimming device. These devices require a user to hold the trimmer with both hands at all times in order to support this unbalanced configuration.

Electric hedge trimmers are generally designed to be held directly by a user and used in the immediate proximity of a user. If a user wishes to trim a hedge which is above the height of the user's head, the typical procedure is to use a step ladder or other height extending device such as a cherry picker. The use of a step ladder involves known safety hazards and devices such as cherry pickers are not available at reasonable cost for the average homeowner or professional gardener. With the increased use of shaped trees in landscaping, the need for trimming at a distance beyond the reach of the user has become more widespread. The use of a step ladder, particularly when combined with the necessity to reach away from the step ladder while holding the trimmer, creates a substantial safety hazard. The ground under a hedge or tree is typically not level and in the case of a hedge there is nothing sturdy against which a ladder may be leaned.

Current hand-held hedge trimmers are therefore limited in their ability to trim hedges or shrubs which are excessively tall or broad. Extended reach hedge trimmers do exist that enable users to better address those difficult trimming applications, but these units are gas engine powered and typically much more expensive than the common, electric hand-held hedge trimmers.

There has been some work in the area of electric, extended reach hedge trimmers, and they basically fall into two categories. One category is an accessory extension handle for a traditional, hand-held hedge trimmer. In the past various extension poles have been proposed which typically would be screwed on to the handle of the tool after which the tool would be plugged in and operated at a remote distance. Such tools, however, have not enjoyed widespread use for several reasons. A common drawback of such devices when used with electrically powered tools is that the electrical cord hangs down from the tool and becomes easily ensnarled in the branches, making it surprisingly easy for the cord to become tangled in the branches which are being trimmed and to actually trim through the electrical cord itself. Furthermore, most such prior art devices have no ready means for turning the tool on and off, which for most trimming operations is a highly desirable feature.

This approach has other disadvantages in that the weight of the traditional, hand-held hedge trimmer exerts too much of a moment on the user when attached to an extended length handle. This approach also requires some additional means to depress the actuation switch of the hedge trimmer, and requires a secondary actuation switch in the extension pole. This approach also limits the variety of cutting planes that a user can create with the cutter bar of the hedge trimmer, thereby further limiting its effectiveness.

A second approach is to construct an extended reach hedge trimmer where the electric motor and the cutter head are separated. The electric motor is located on the lower end of an extended length handle, and the cutter head is on the upper end of the extended length handle. The output of the electric motor is connected to the cutter blade input by means of a flexible shaft that runs, through the extended handle, between the cutter head and the electric motor. The drawback of this approach is the expense of the flexible metal shaft and the expense of separate housings for the cutter head and the motor housing. Both of these approaches are limited in that a user who has both low to medium size shrubs and large, tall shrubs would need a traditional, hand-held hedge trimmer and an extended reach hedge trimmer.

SUMMARY OF THE INVENTION

The present invention provides an extended reach electric-powered hedge trimmer providing improved controlled cutting plane adjustability and safety of operation, comprising a powerhead including a motor (preferably an electric motor although alternate embodiments may use an internal combustion engine) and output gearing engaged to the motor, a cutter blade assembly engaged to the motor output gearing, a yoke or bracket which allows the powerhead to pivot about an axis of rotation on the yoke, a pole which forms an upper handle and connects the yoke to a lower handle containing, in embodiments using an electric motor, an actuation switch and an electric plug for connection to an electric power source. As mentioned earlier, the powerhead rotates about an axis on the yoke, and the desired orientation of the cutting plane of the powerhead and cutter blade can be fixed with locking means, which in one embodiment comprises a lockable pivot spool/post system coupling the powerhead to the yoke.

One feature of the present invention which enables the powerhead to pivot in embodiments using an electric motor involves how the electric wiring is run between an actuation switch and the electric motor. Wiring is connected to an actuation switch in the lower handle and routed through the interior of a pole. The wiring thence exits the upper end of the pole and enters the yoke through an aperture in the yoke. In one embodiment of the invention, the wiring is routed through a channel in an arm of the yoke prior to entering the aperture. A strain relief apparatus for the electrical wiring is captured statically via space provided in a boss on one of the yoke arms. Alternatively, the strain relief apparatus and the boss may comprise an integral unit. A central axis of this boss is generally co-linear with the axis of rotation of the yoke. This feature provides entry to the powerhead for the electrical wiring and permits rotation of the powerhead while holding the strain relief apparatus and the electrical wiring stationary.

Another unique feature of this invention is its use of a friction brake to control unrestrained rotation of the powerhead when the lockable pivot spool is disengaged by the user. While in one embodiment of the invention the axis of rotation of the powerhead is located at, or near, the powerhead and cutter bar's center of mass, the weight and natural rotational momentum of the powerhead may cause unintentional rotation of the powerhead and cutter blade when the lockable pivot spool is disengaged. Any unintentional rotation of the powerhead when the lockable pivot spool is disengaged could cause accidental injury to the user.

To remedy this problem, a friction brake is disposed between a yoke surface used to create the rotational axis and the interior of the powerhead housing or casing. By maintaining controlled pressure between the powerhead casing, the friction brake, and the rotational axis surface of the yoke, a resistance to angular rotation is created that is greater than the rotational moment of the powerhead and cutter blade. This feature of the present invention enables the user to disengage the lockable pivot spool and reorient the position of the powerhead in a safe, controlled manner. In one embodiment of the invention, a simple, elastic "O" ring is used as the friction brake, but the present invention is not intended to be limited to such an embodiment. Instead, the invention is intended to cover the range of materials and construction which can serve to create the same intended function of a friction brake.

The present invention has advantages over the current state of the art in that it does not include the complexity and expense of separate housings for the cutting head and the motor or a flexible shaft to connect the motor to the cutting head. The present invention also allows the user, through a variety of handle and cutting plane orientations, to address all ranges of hedge trimming from large, tall shrubs to small and medium sized shrubs without bending, stooping or using ladders.

BRIEF DESCRIPTION OF THE DRAWING FIGURES

FIG. 9b is a view of an embodiment of the yoke taken along line 9b-9b of FIG. 9a.

DETAILED DESCRIPTION OF THE PREFERRED EMBODIMENT(S)

Referring now to FIGS. 1-7 and in accordance with a constructed embodiment of the present invention, an extended reach hedge trimmer 10 comprises a powerhead 50 having an outer casing 51 enclosing a motor, which in the embodiment shown is an electric motor 55, an output gearing 58 engaged to and driven by the motor 55, and a cutter blade assembly 80 connected to the powerhead 50 and engaged by the output gearing 58. The cutter assembly 80 is driven by the electric motor 55 via the output gearing 58 when electric power is supplied to the motor 55. Furthermore, the invention further comprises a yoke 70 having a base portion 71 and two co-planar arms 72 and 73 spaced apart in a general "Y" or wishbone configuration, with each arm 72 and 73 having a mounting assembly 74, 76, respectively disposed, near the ends thereof that pivotally connect to the sides of the powerhead casing 51 such that the powerhead 50 is pivotally mounted to the yoke 70. A pole 12 includes an upper handle portion 30 which connects to the base portion of the yoke 70 and a lower handle portion 20 containing an actuation switch or trigger 40 which, when depressed, permits electrical power to be supplied from a power source connected to the electric motor 55 to drive the cutter blade assembly 80, thereby to resulting in a cutting action.

Referring now to FIGS. 2-5, in one embodiment of the invention the yoke mounting assembly 74 comprises, at yoke arm 72, a mounting boss 59 disposed generally perpendicularly inwardly from the inner side of arm 72 proximate the end thereof and having a flat end portion 500 at the end of said boss 59 which fits into a matching opening with a slot 61 disposed on the inner surface of the powerhead casing 51 on a side near the front end of the powerhead 50. The boss 59 is fixed to powerhead casing 51 when the flat end portion 500 of boss 59 is inserted in the matching casing opening, while the yoke arm 72 remains rotatable around the circumference of boss 59.

Figure 5:
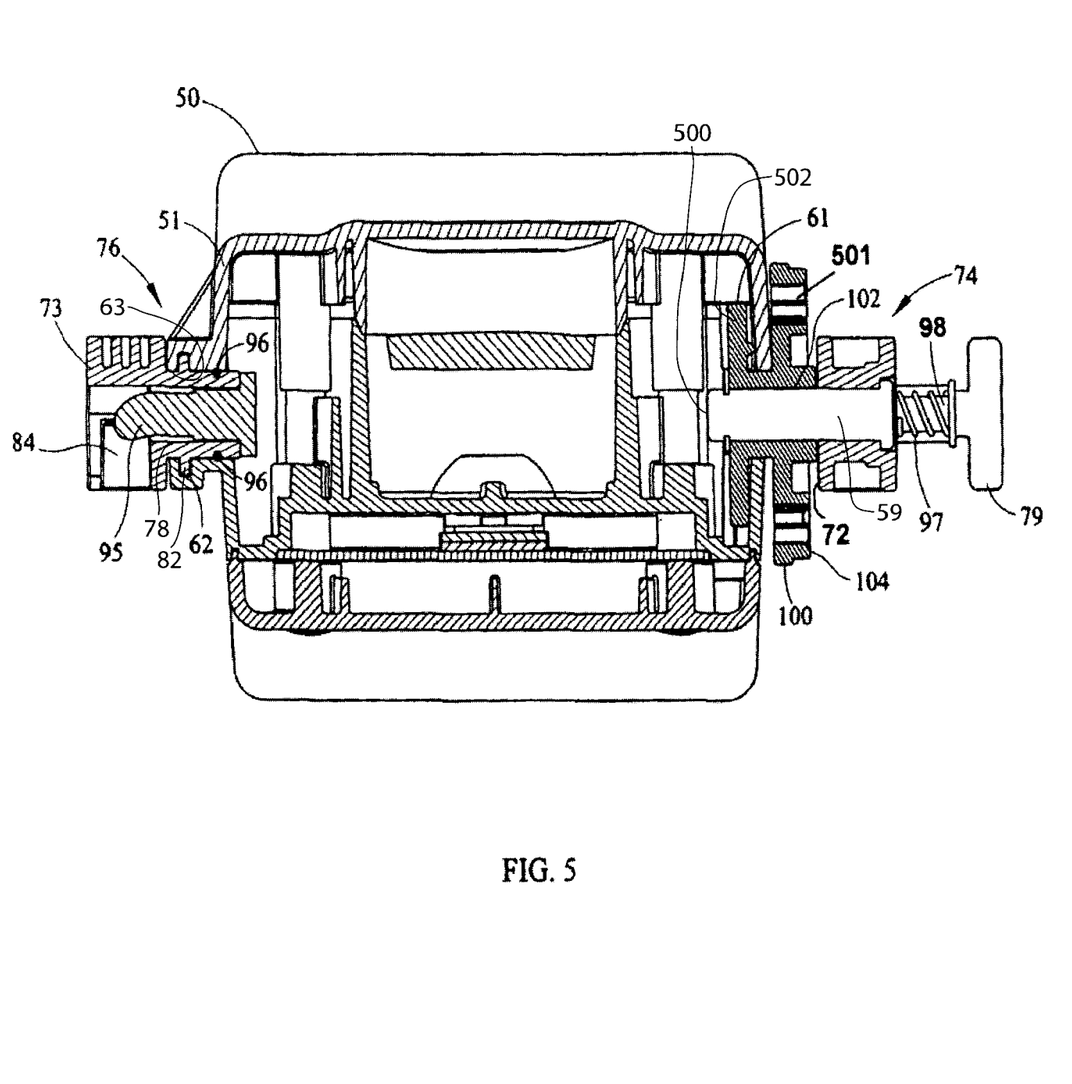
FIG. 5 is a side view of the powerhead taken in cross-section in accordance with the present invention.
Figure 6:
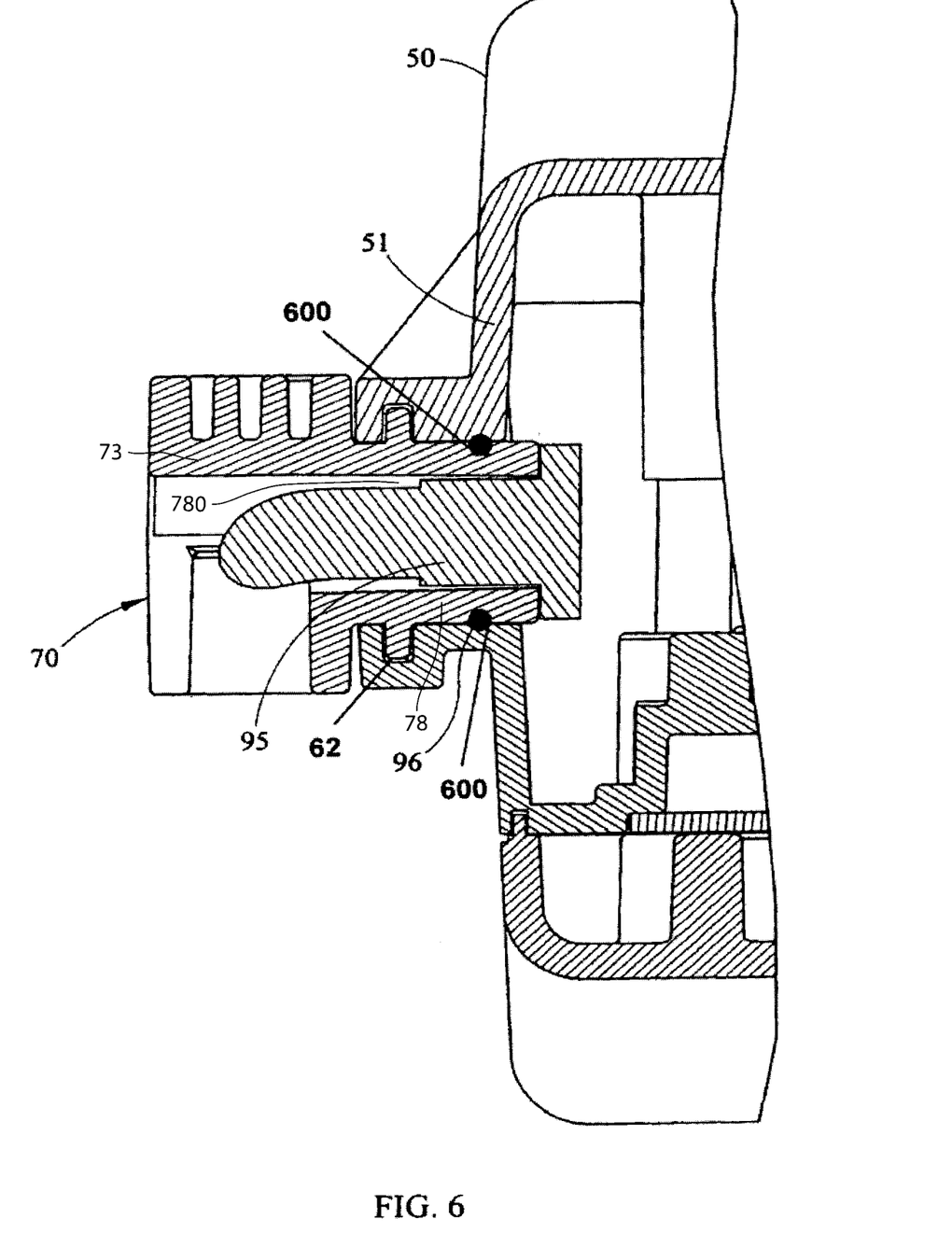
FIG. 6 is a side view of the powerhead taken in cross section in accordance with the present invention.
Figure 7:
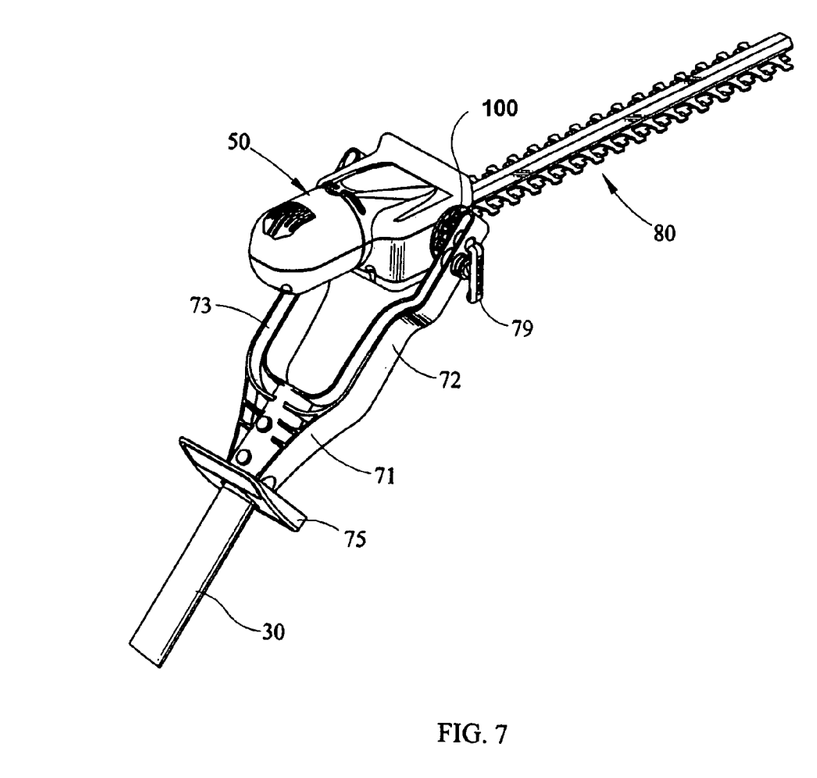
FIG. 7 is a rear side perspective view of the extended reach hedge trimmer in accordance with the present invention.

A circular pivot spool 100 is disposed between the powerhead casing 51 outer surface and the inner side of yoke arm 72, and the boss 59 is inserted through a hole 102 in the center of the circular spool 100. The circular spool 100 comprises an outer surface 104 having a plurality of apertures 501 therein shaped to accept a locking post 98, and an inner portion 502 that is disposed in the slot 61. Yoke arm 72 also has an aperture 720 disposed parallel and adjacent to the boss 59, either closer to or farther from the end of yoke arm 72, through which the locking post 98 is disposed. The locking post 98 has a handle 79 biased for locking and unlocking the powerhead 50 in position at the desired cutting plane. The locking post 98, as shown in FIG. 5 is preferably configured such that the post 98 is normally in the engaged or locked position with a spring means 97 providing tension to bias the post 98 against the circular spool 100.

Figure 1:
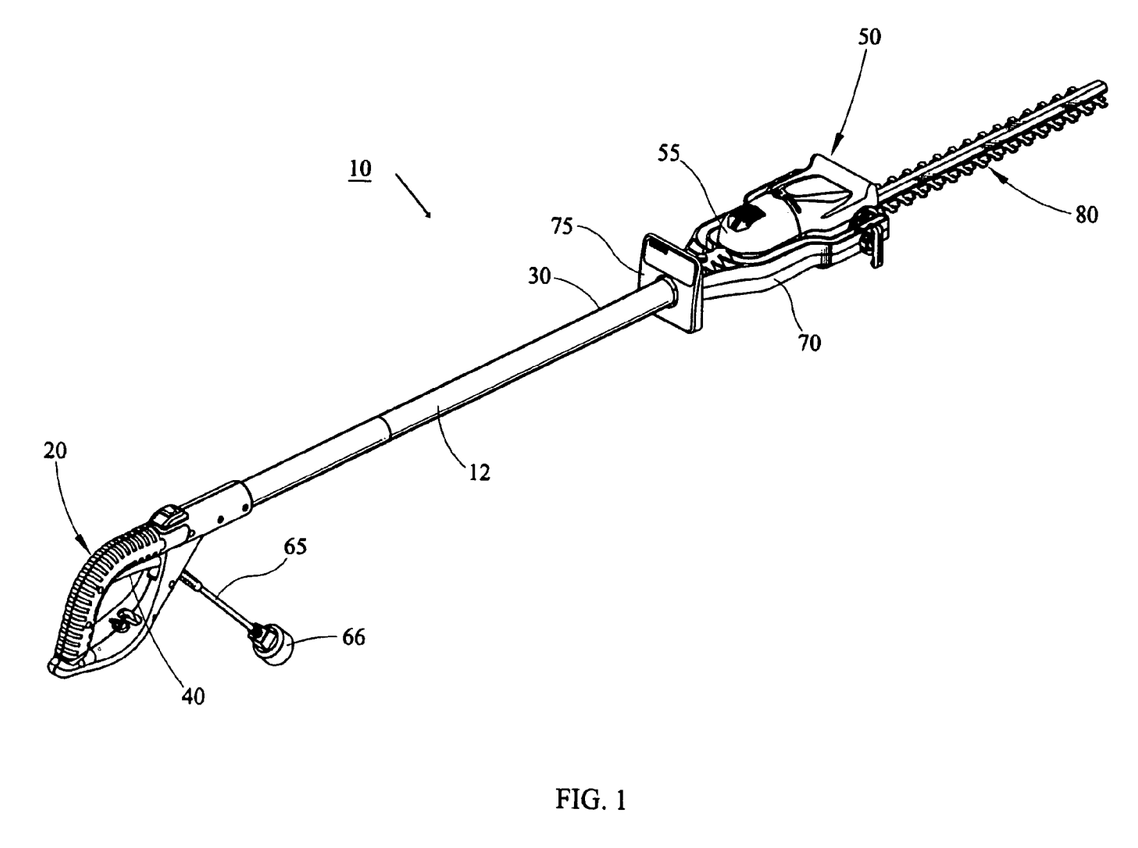
FIG. 1 is a perspective view of the extended reach hedge trimmer in accordance with one embodiment of the invention.
Figure 2:
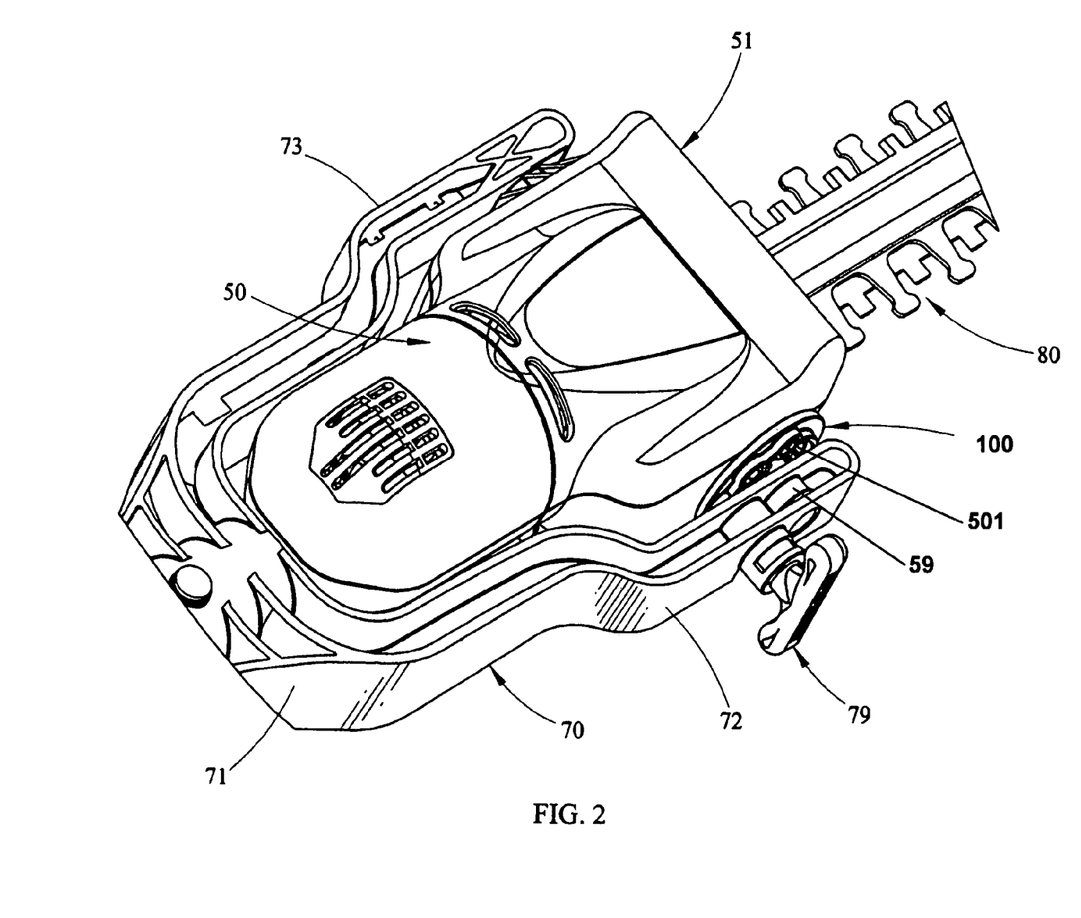
FIG. 2 is a top rear angle perspective view of the powerhead, yoke and lockable pivot spool of the hedge trimmer, in accordance with the present invention.
Figure 3:
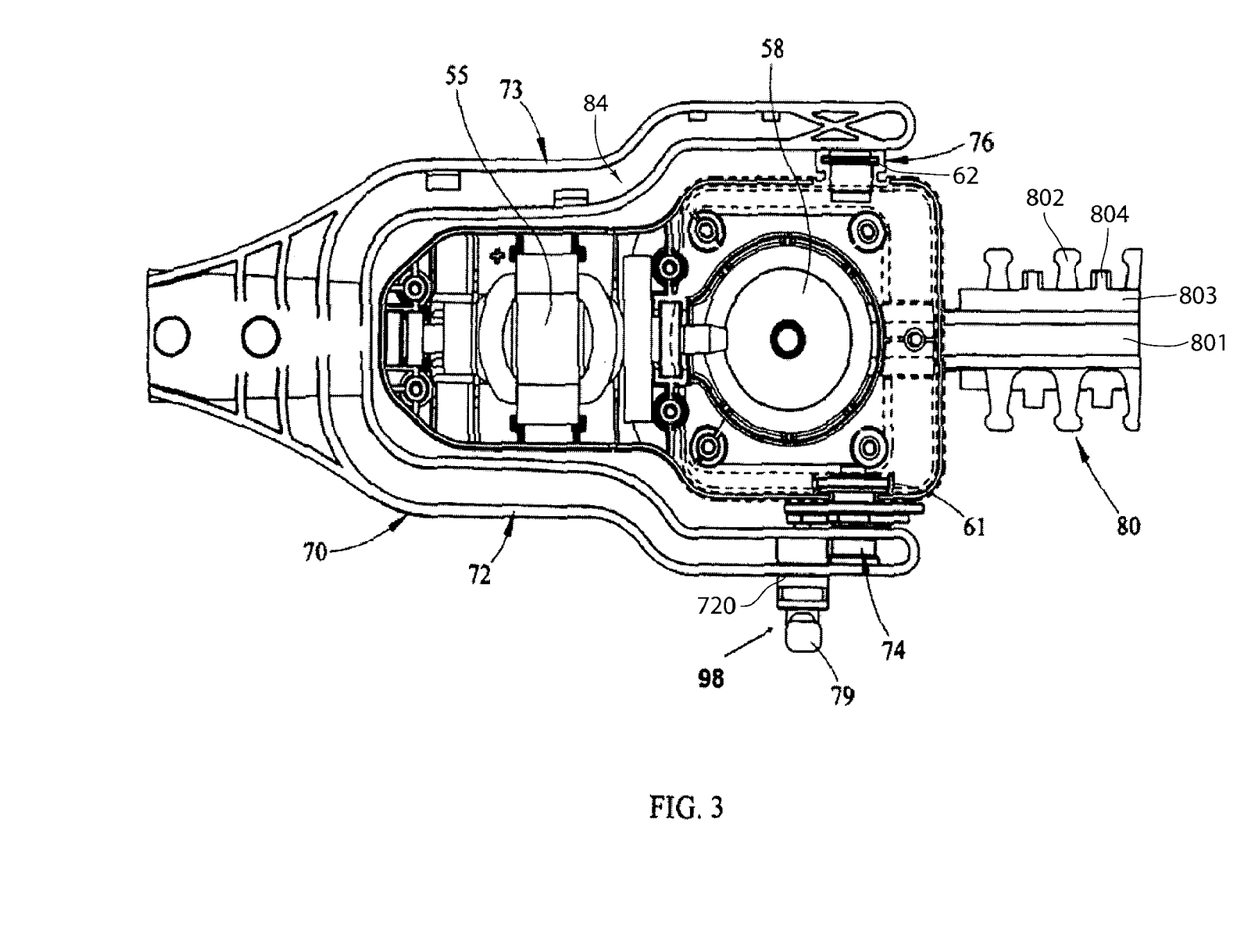
FIG. 3 is a top perspective sectional view of the powerhead in accordance with the present invention.
Figure 4:
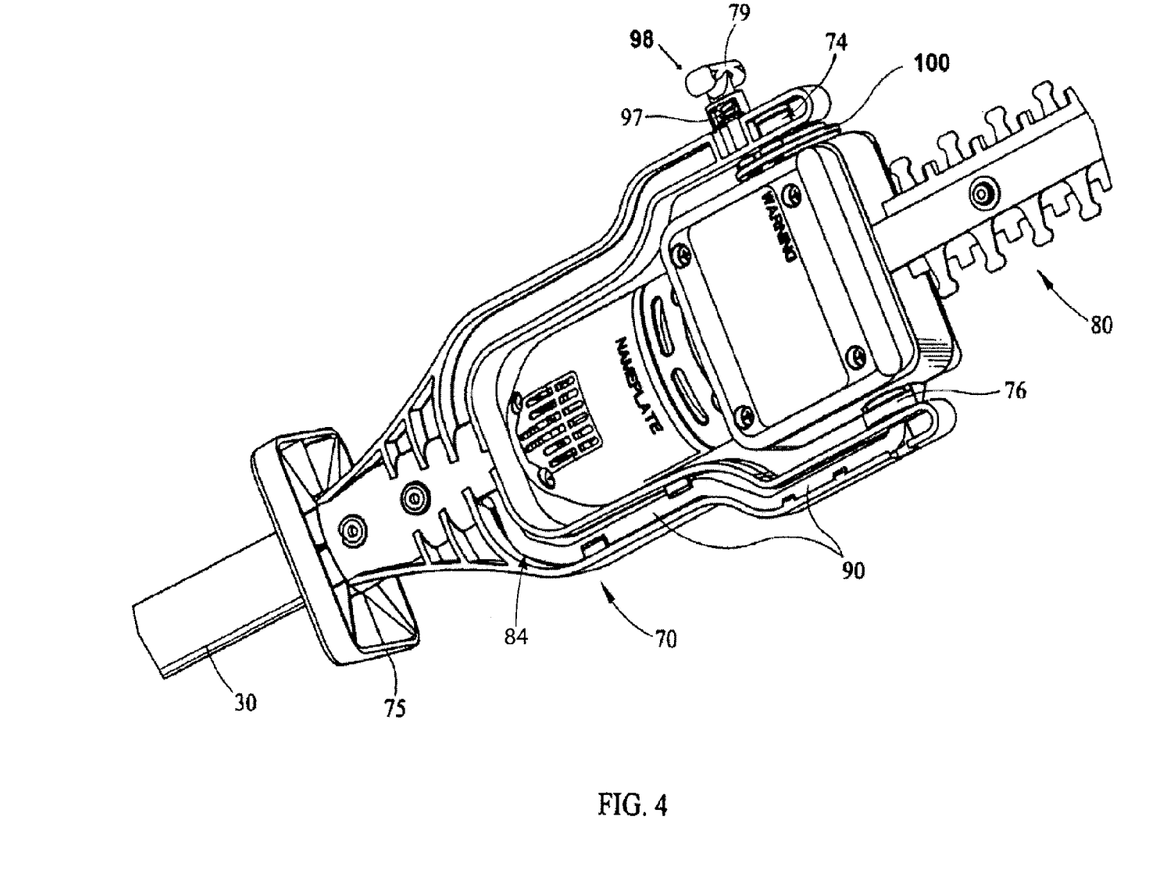
FIG. 4 is a perspective view of the upper portion of the extended reach hedge trimmer in accordance with the present invention.

The other yoke mounting assembly 76 preferably comprises a hollow boss 78 shown integral with and disposed perpendicularly to yoke arm 73 and coaxially with the boss 59 of yoke mounting assembly 74. The boss 78 is preferably hollow with an axially extending aperture 780 such that electrical wiring may be routed through it from the pole 12 to yoke arm 73 and into the powerhead 50 without limiting the range of rotation possible for the powerhead 50. The boss 78 has an integral land 82 protruding around its circumference which engages a matching slot 62 in the interior of powerhead casing side aperture 63. Referring to FIGS. 3 and 5, the powerhead 50 is pivotally connected to the yoke 70 by fitting the boss 78 into the matching slot 62 and by fitting the boss 59 into the matching slot 61 in the powerhead casing 51 when the powerhead casing halves are separated, and then securing the powerhead casing halves together.

Figure 8:
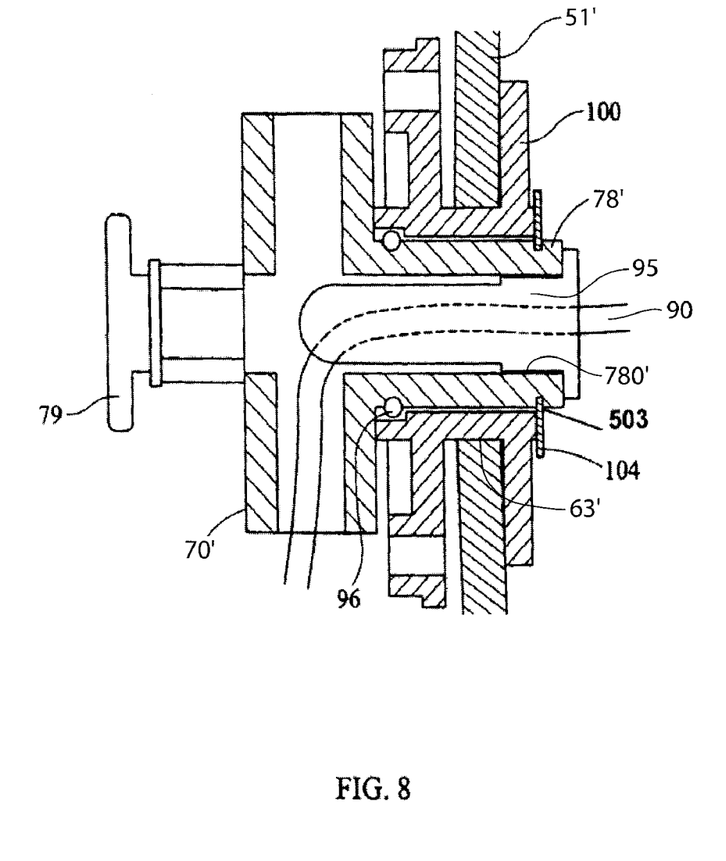
FIG. 8 is a sectional view of an embodiment of the yoke and rotational assembly in accordance with one embodiment of the present invention.
Figure 9A:
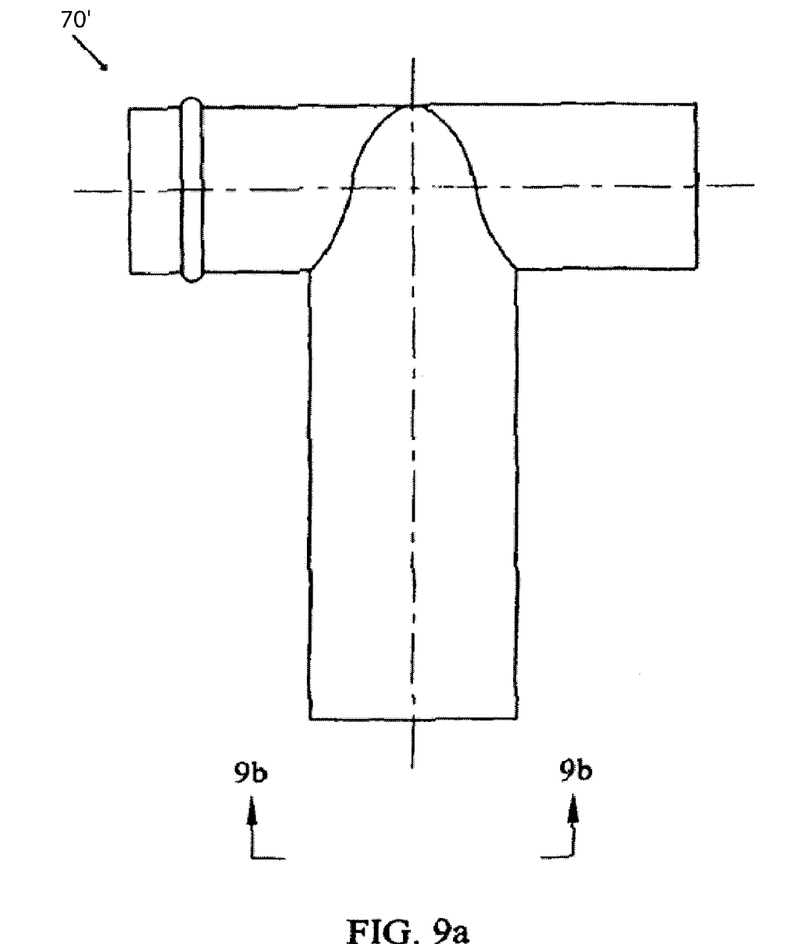
FIG. 9a is a view of an embodiment of the yoke in accordance with one embodiment of the present invention.
Figure 9B:
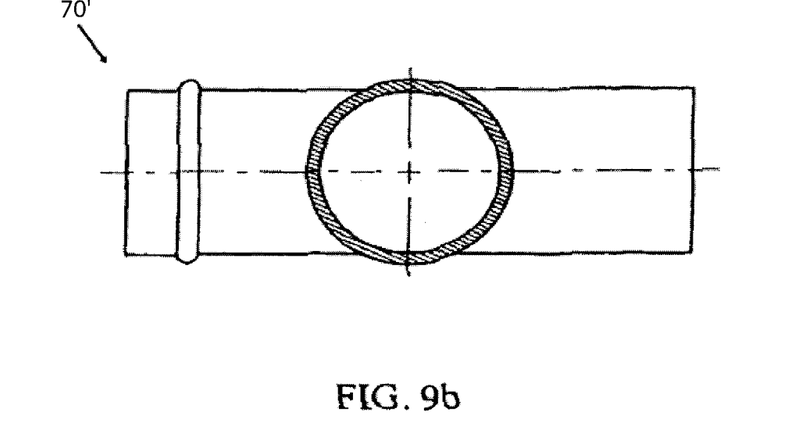

As best seen in FIG. 8, in an alternative embodiment of the present invention, the yoke 70' may be configured so that the hollow boss 78' is secured directly thereto and includes an aperture 780' therein as in the previous embodiment. Accordingly, the powerhead 50 is rotatably secured to the boss 78'. In this embodiment, however, the powerhead 50 is pivotally connected to the yoke 70' by fitting boss 78' into the matching aperture 63' in the powerhead casing 51'. As can be readily seen, this embodiment of the present invention does not require the use of yoke arms 72,73 to secure the powerhead 50 to the yoke 70'. In a yet further embodiment of the present invention, a single yoke arm 72 may be employed to mount the powerhead to the yoke 50.

A guard shield 75 may also be provided between the upper handle 30 and the base portion 71 of the powerhead 50 so as to prevent the operator's hands from inadvertently slipping off the upper handle 30 and into the cutting blades. In one embodiment of the invention, the guard shield 75 is formed as an integral part of the base portion 71 of powerhead 50. The lower handle portion 20 of pole 12 includes an electrical plug 66 preferably extending from lower handle portion 20 via an electrical cord 65. The plug 66 has an end which connects to cord 65 and a pronged end that may be connected, via an electrical extension cord, to an electric power supply outlet in order to supply power to operate the hedge trimmer. The other end of the cord 65 is connected to trigger 40.

Electrical wiring 90 is connected to the trigger switch 40 and then is routed through a tubular passage within the pole 12 and through the yoke arm 73 and connects at the other end to the electric motor 55. The electrical wiring 90 exits the upper handle portion 30 of pole 12 via an opening at the end of the upper handle portion 30 and enters the yoke 70 through an opening at the base portion 71 thereof. The electric wiring 90 is then routed through a channel or void 84 disposed in one of the arms of yoke 70 (ex.—yoke arm 73) to an aperture (not shown) disposed within the yoke mounting assembly 76.

Alternatively, the wiring may be routed directly from the yoke 70 to the hollow boss 78' in the embodiment of the invention where no yoke arms 72, 73 are required. As best shown in FIG. 8, in this embodiment of the invention, a snap ring 104 may be disposed in a corresponding slot 503 in the hollow boss 78' to secure the hollow boss 78' to the powerhead 50. The wiring is routed through the hollow boss 78' and a concomitant strain relief apparatus 95 into the interior of the powerhead 50.

The strain relief apparatus 95 for the electrical wiring 90 is provided within the yoke mounting assembly 76. The strain relief apparatus 95 may include an axial passage or aperture therethrough (shown schematically in FIG. 8) that provides for entry of the electrical wiring 90 to the powerhead 50 and permits rotation of the powerhead 50 while preventing rotation of the strain relief apparatus 95 and the electrical wiring 90.

A friction brake 96 is disposed between one of the two yoke arm mounting assemblies 74 and 76 and the compatible powerhead casing side aperture interior surface (depending on whether the friction brake is positioned at yoke arm 72 or 73). In one embodiment of the present invention, depicted in FIG. 6, the friction brake 96 is disposed adjacent slot 62 between the boss 78 of yoke arm 73 and the casing 51. The friction brake 96 comprises a surface channel or groove 600 disposed around the outer circumference of the boss 78 into which is inserted a rubber "O" ring sized to fit in the surface channel 600 to maintain a controlled frictional press between the powerhead casing 51 and the boss 78. This feature of the invention enables the user to disengage the lockable pivot spool 100 and re-orient the position of the cutter blade assembly 80 to the desired cutting plane in a safe and controlled manner. One of ordinary skill in the art will recognize that a wide variety of materials may be used for the "O" ring friction brake 96 of the present invention, as long as the frictional force created by the brake 96 is sufficient to overcome the rotational force generated by the weight of the powerhead 50.

One embodiment of this invention incorporates the ability for the powerhead 50 and the cutter blade assembly 80 to pivot about the yoke approximately 90 degrees in either direction from a position where the cutter blade assembly 80 is in-line with the extended handle; but this invention is not limited to this range of rotational motion.

Another embodiment of this invention utilizes a fixed length pole to form the upper extended handle 30 of the device, but could also employ a telescoping pole assembly as the upper extended handle. The pole assembly can be made of plastic, metal, fiberglass or other suitable materials and is preferably hollow so that electrical cord can be run through the interior thereof.

Another embodiment of this invention employs a 120 VAC electric motor connected by an extension cord to a power source, but this invention could also be adapted for a DC powered electric motor with a rechargeable battery located on the lower end of the pole or as a separate battery pack.

The powerhead 50 casing may be made of molded plastic material although metal or other rigid casing material can be used. The cutter blade assembly 80 is a conventional hedge trimmer reciprocating blade type. The cutter blade assembly 80 extends longitudinally from the powerhead 50 and includes, as is known in the art, an elongate bar 801 having a plurality of blades 802 extending horizontally outward from its sides and an elongate longitudinally reciprocating cutter 803 having a plurality of blades 804 extending horizontally outward from its sides disposed parallel and adjacent to the blades 802 of the bar 801. The blades 802 of the bar 801 and the blades 804 of the cutter 803 cooperate to slice hedge vegetation between them as the cutter 803 reciprocates. Alternate embodiments of the cutter blade assembly can be utilized, such as, without limitation, including blades at the front end of the cutter and/or bar.

The output gearing 58 is of the type used in conventional hedge trimmers to translate the electric motor output rotation to the cutter blade assembly reciprocation although other mechanisms for converting power transmitted by an electric or gas motor output to reciprocating motion for operating the above-described cutter assembly 80 can be utilized in alternate embodiments.

While the present invention has been shown and described herein in what are considered to be the preferred embodiments thereof, illustrating the results and advantages over the prior art obtained through the present invention, the invention is not limited to those specific embodiments. Thus, the forms of the invention shown and described herein are to be taken as illustrative only and other embodiments may be selected without departing from the scope of the present invention.

What is claimed is:

1. An extended reach power tool apparatus comprising:
   a powerhead comprising a motor and a casing enclosing the motor;
   a yoke having a base portion capable of being secured to a pole, and a boss extending in a lateral direction from said yoke, said boss pivotally secured to said powerhead whereby said powerhead is rotatable about said boss relative to said yoke to rotational positions;
   a locking mechanism releasably connecting said powerhead to said yoke by locking said powerhead to said yoke in a selected one of a plurality of said rotational positions, said locking mechanism being capable of being locked in each of said plurality of said rotational positions and unlocked for allowing rotation of said powerhead relative to said yoke to said rotational positions,
   wherein a friction brake is disposed between said boss and the casing of said powerhead for inhibiting the free rotation of said powerhead when said locking mechanism is unlocked; and
   a cutter blade assembly, said cutter blade assembly being connected to said powerhead, said cutter blade assembly being engaged by an output gearing, said output gearing being engagable by and driven by the motor, wherein the cutter blade assembly extends in a longitudinal direction from the powerhead and includes an elongate bar extending in said longitudinal direction and having a plurality of blades extending laterally outward from sides of the elongate bar, the cutter blade assembly further including a longitudinally reciprocating cutter extending in said longitudinal direction and having a plurality of blades extending laterally outward from sides of the reciprocating cutter, said blades of the reciprocating cutter disposed parallel and adjacent to said blades of the elongate bar,
   wherein said boss comprises an aperture extending axially therethrough in said lateral direction, and power wiring is routed through said aperture in said lateral direction to said powerhead so as to facilitate routing said wiring from a power source through the pole to said powerhead.

2. An extended reach power tool apparatus as claimed in claim 1 wherein said friction brake comprises an o-ring disposed between said boss and the casing of said powerhead.

3. An extended reach power tool apparatus as claimed in claim 1 wherein said power wiring enters said casing substantially co-linear with an axis of rotation of said powerhead.

4. An extended reach power tool apparatus as claimed in claim 1 wherein the casing of said powerhead further comprises at least one aperture therein, said aperture having an inner wall with a circumferential slot therein, and wherein said boss further comprises a circumferential land engaging the corresponding slot in the aperture inner wall.

5. An extended reach power tool apparatus as claimed in claim 1 further comprising:
   a circumferential groove in said boss wherein said friction brake comprises an o-ring disposed in the circumferential groove.

6. An extended reach power tool apparatus as claimed in claim 1 wherein said locking mechanism comprises a pivot spool and a post mechanism.

7. An extended reach power tool apparatus as claimed in claim 1 further comprising a strain relief apparatus disposed in the axially extending aperture of said boss for preventing frictional wear on said power wiring routed to said powerhead.

8. An extended reach power tool apparatus as claimed in claim 7 wherein said strain relief apparatus comprises an aperture therethrough in communication with said powerhead at a first end for routing said wiring from said yoke to the powerhead while minimizing frictional wear on the wiring.

9. An extended reach power tool apparatus as claimed in claim 7 wherein said boss and said strain relief apparatus are an integral unit.

10. An extended reach power tool apparatus as claimed in claim 1 wherein said yoke further comprises an arm wherein said boss is secured to said arm.

11. An extended reach power tool apparatus as claimed in claim 10 wherein said friction brake comprises an o-ring disposed between said boss and the casing of said powerhead.

12. An extended reach power tool apparatus as claimed in claim 10 further comprising:
   a circumferential groove in said boss wherein said friction brake comprises an o-ring disposed in the circumferential groove.

13. An extended reach power tool apparatus as claimed in claim 10 wherein the arm of said yoke further comprises a channel for routing said power wiring from said source through the pole to said powerhead.

14. An extended reach power tool apparatus as claimed in claim 10 wherein said power wiring enters said casing substantially co-linear with an axis of rotation of said powerhead.

15. An extended reach power tool apparatus as claimed in claim 10 wherein the casing of said powerhead further comprises at least one aperture therein, said aperture having an inner wall with a circumferential slot therein, and wherein said boss further comprises a circumferential land engaging the corresponding slot in the aperture inner wall.

16. An extended reach power tool apparatus as claimed in claim 10 wherein said locking mechanism comprises a pivot spool and a post mechanism.

17. An extended reach power tool apparatus as claimed in claim 10 further comprising a strain relief apparatus disposed in the axially extending aperture of said boss for preventing frictional wear on said power wiring routed to said powerhead.

18. An extended reach power tool apparatus as claimed in claim 17 wherein said strain relief apparatus comprises an aperture therethrough in communication with said powerhead at a first end for routing said wiring from said yoke to the powerhead while minimizing frictional wear on the wiring.

19. An extended reach power tool apparatus as claimed in claim 17 wherein said boss and said strain relief apparatus are an integral unit.

* * * * *